(12) United States Patent
Gaillard Allemand

(10) Patent No.: US 8,518,532 B2
(45) Date of Patent: Aug. 27, 2013

(54) CRYSTAL VOLUME HAVING A DECORATIVE DICHROIC VISUAL EFFECT

(75) Inventor: Bruno Gaillard Allemand, Glonville (FR)

(73) Assignee: Baccarat, Baccarat (FR)

( * ) Notice: Subject to any disclaimer, the term of this patent is extended or adjusted under 35 U.S.C. 154(b) by 720 days.

(21) Appl. No.: 11/792,303

(22) PCT Filed: Dec. 23, 2005

(86) PCT No.: PCT/FR2005/003281
§ 371 (c)(1),
(2), (4) Date: Oct. 5, 2007

(87) PCT Pub. No.: WO2006/070137
PCT Pub. Date: Jul. 6, 2006

(65) Prior Publication Data
US 2008/0096011 A1    Apr. 24, 2008

(30) Foreign Application Priority Data
Dec. 24, 2004 (EP) .................................... 04360113

(51) Int. Cl.
*B32B 7/02*    (2006.01)
*B32B 17/06*    (2006.01)

(52) U.S. Cl.
USPC ............................ 428/332; 428/216; 428/432

(58) Field of Classification Search
USPC .......................................... 428/216, 332, 432
See application file for complete search history.

(56) References Cited

U.S. PATENT DOCUMENTS

| | | | | |
|---|---|---|---|---|
| 5,215,832 A * | 6/1993 | Hughes et al. | ............... | 428/623 |
| 5,659,423 A * | 8/1997 | Schierbeek et al. | .......... | 359/604 |
| 5,853,826 A * | 12/1998 | Starcke et al. | .................. | 428/15 |
| 6,235,105 B1 * | 5/2001 | Hubbard et al. | ............... | 106/415 |
| 6,292,302 B1 * | 9/2001 | Krisko et al. | .................. | 359/634 |
| 2001/0031365 A1 * | 10/2001 | Anderson et al. | ............. | 428/432 |
| 2004/0053068 A1 | 3/2004 | Schicht et al. | | |
| 2004/0083759 A1 * | 5/2004 | Starcke et al. | .................... | 63/32 |

FOREIGN PATENT DOCUMENTS
EP    248525 A2 * 12/1987

* cited by examiner

Primary Examiner — David Sample
Assistant Examiner — Tahseen N Khan
(74) Attorney, Agent, or Firm — Oliff & Berridge, PLC

(57) ABSTRACT

The invention concerns a volume of transparent amorphous vitreous material such as crystal or glass whereof one part of the outer surface is coated with successive layers of metal or ceramic particles designed to provide it with a decorative dichroic visual effect when said part is observed through a volume of the transparent material. The succession of layers observes the following scheme: at least one alternation of two transparent layers of metal and/or ceramic particles in contact with the crystal; then a final reflecting opaque layer consisting of metal.

12 Claims, No Drawings

CRYSTAL VOLUME HAVING A DECORATIVE DICHROIC VISUAL EFFECT

The present invention relates to a volume of transparent amorphous material of the crystal or glass type, whereof one part of the outer surface is coated with successive layers of metal or ceramic particles designed to provide it with a decorative visual effect. The invention also relates to crystal jewelry containing at least one volume in such a material, and whereof a surface is coated by said succession of layers. In the following, for the sake of clarity, reference will only be made to the crystal, which however is only an example of a possible application.

The sought-after visual effect in fact results from a dichroism phenomenon obtained by the combination of the crystal and of the superposition of layers, causing changes in the coloration of the portion coated with layers notably according to the angle of incidence of the observation through the crystal. In fact, the combination of a crystal volume with metal coatings has already been used in the past, the association of a first chromium layer with a deposit of gold or gold-based alloy having already been achieved for example. These coatings in particular have the purpose of providing the volume of crystal with the hue of the precious metal which is combined with it, in order to enhance its jewel connotation and to better mark it as a luxury jewelry article.

The object of the present invention is to propose a more extended visual effect of a dichroic nature, providing the observer with a much more extended palette of colors as previously.

For this purpose, a portion of the external surface of the volume of the crystal is coated with a succession of layers which observes the following scheme, according to the invention:

at least one alternation of two transparent layers of metal or ceramic particles in contact with the crystal; and then a final reflecting opaque layer consisting of metal.

Conventionally, in order that the dichroism phenomenon may better be demonstrated, a final opaque layer should actually prevent transmission of light rays on the one hand and should allow reflection of the radiation on the other hand. Actual dichroism is obtained by the combination of the crystal volume through which the observation is made, which notably has an effect on the direction of the incident and reflected light rays depending on to their wavelength, and of transparent layers of metal and/or ceramic particles which absorb/reflect differently the various wavelengths of visible light.

Preferably, according to the invention, the metal forming the final opaque layer may be titanium (Ti) or alternatively it may be chromium (Cr).

These metals are notably of interest for their physicochemical properties, and in particular their great hardness, their capacity of withstanding abrasion and chemical products.

Still preferably, the succession of applied layers on the external surface portion of a crystal only includes one or two alternations of said two layers of metal or ceramic particles.

In the past, a much larger number of alternations of layers were already used for producing iridescence effects, for example. In this case, experience has shown that the existence of a single alternation of two layers or even two alternations (4 layers) provides the best visual effects.

According to a possible configuration, said alternation(s) of layers each consist(s) of a pair formed by a $SiO_2$ layer and a $TiO_2$ layer. Any other material having similar physicochemical properties may however be used.

Under the assumption of the combined use of $SiO_2$ and $TiO_2$, each alternation is therefore produced by ceramic particles, whereof the mechanical properties (hardness, high resistance) and the low chemical reactivity are well known.

Alternatively, each alternation may also consist of a pair formed by an $MgF_2$ layer and a Cr layer. The difference between the pairs of materials used under both assumptions notably lies in the colors which may be visualized through the crystal.

Selection of the materials is in fact notably performed from the optical properties, in particular their refractive index, in order to obtain specific optical results which match them.

In order to primarily provide the expected visual effects, but also to meet colorimetric requirements, selection of the thickness of the different layers is also important.

Thus, the final opaque layer, according to the invention has a thickness larger than or equal to 50 nm.

Also, preferably, the thickness of the first layer of each alternation is between 50 and 500 nm. Finally, the thickness of the second layer of each alternation is between 90 and 400 nm.

As also specified, the invention relates not only to a crystal volume coated with these different layers, but also to jewels which are provided therewith. Said jewels may be of the ring, earring, pendant, brooch, etc. . . . and include a volume of crystal or of a transparent amorphous material as they have been defined earlier.

More specifically, this volume may assume various geometries, and in particular assume the shape of a cabochon including a surface on which is applied the succession of the layers as defined earlier.

The metal and/or ceramic coating on the volume of the crystal is obtained by technique known per se, such as evaporation in vacuo, sputtering or even magnetron sputtering.

The volume of crystals of the invention, thereby coated with successive layers of particles providing them with the visual effect as described earlier, may of course be used in applications which are not limited to the jewels explicitly mentioned in this text.

The invention claimed is:

1. A jewel comprising a volume of transparent amorphous vitreous material of the crystal type, whereof a portion of the external surface is coated with successive layers of metal or ceramic particles designed to provide it with a decorative dichroic visual effect when said portion is observed through the volume of the transparent material,
    wherein the succession of the layers observes the following scheme:
        at least one alternation of two transparent layers of metal and/or ceramic particles in contact with the crystal; then
        a final reflecting opaque layer consisting of metal;
    said final reflecting opaque layer allowing reflectance and preventing transmittance of light.

2. The jewel according to claim 1, wherein the metal forming the final opaque layer is titanium (Ti).

3. The jewel according to claim 1, wherein the metal forming the final opaque layer is chromium (Cr).

4. The jewel according to claim 1, wherein the succession of layers includes one or two alternations of two layers of metal or ceramic particles.

5. The jewel according to claim 1, wherein the alternation(s) of layers each consist(s) of a pair formed with a $SiO_2$ layer and a $TiO_2$ layer.

6. The jewel according to claim 1, wherein the alternation(s) of layers each consist(s) of a pair formed with an $MgF_2$ layer and Cr layer.

7. The jewel according to claim 1, wherein the final opaque layer has a thickness larger than or equal to 50 nm.

8. The jewel according to claim 1, wherein the thickness of the first layer of each alternation is between 50 and 500 nm.

9. The jewel according to claim 1, wherein the thickness of the second layer of each alternation is between 90 and 400 nm.

10. The jewel according to claim 1, wherein the crystal volume is a cabochon on a surface of which the succession of layers is applied.

11. The jewel according to claim 1, wherein at least one layer of the two transparent layers is of ceramic particles.

12. The jewel according to claim 1, wherein the two transparent layers are of ceramic particles.

* * * * *